Feb. 1, 1966   L. H. CONNELL ETAL   3,233,030
APPARATUS FOR HIGH FREQUENCY TREATMENT OF ORE
Filed May 12, 1960   2 Sheets-Sheet 1

Inventors
Lawrence H. Connell
Lowell A. Moe by *[signature]*   Attys

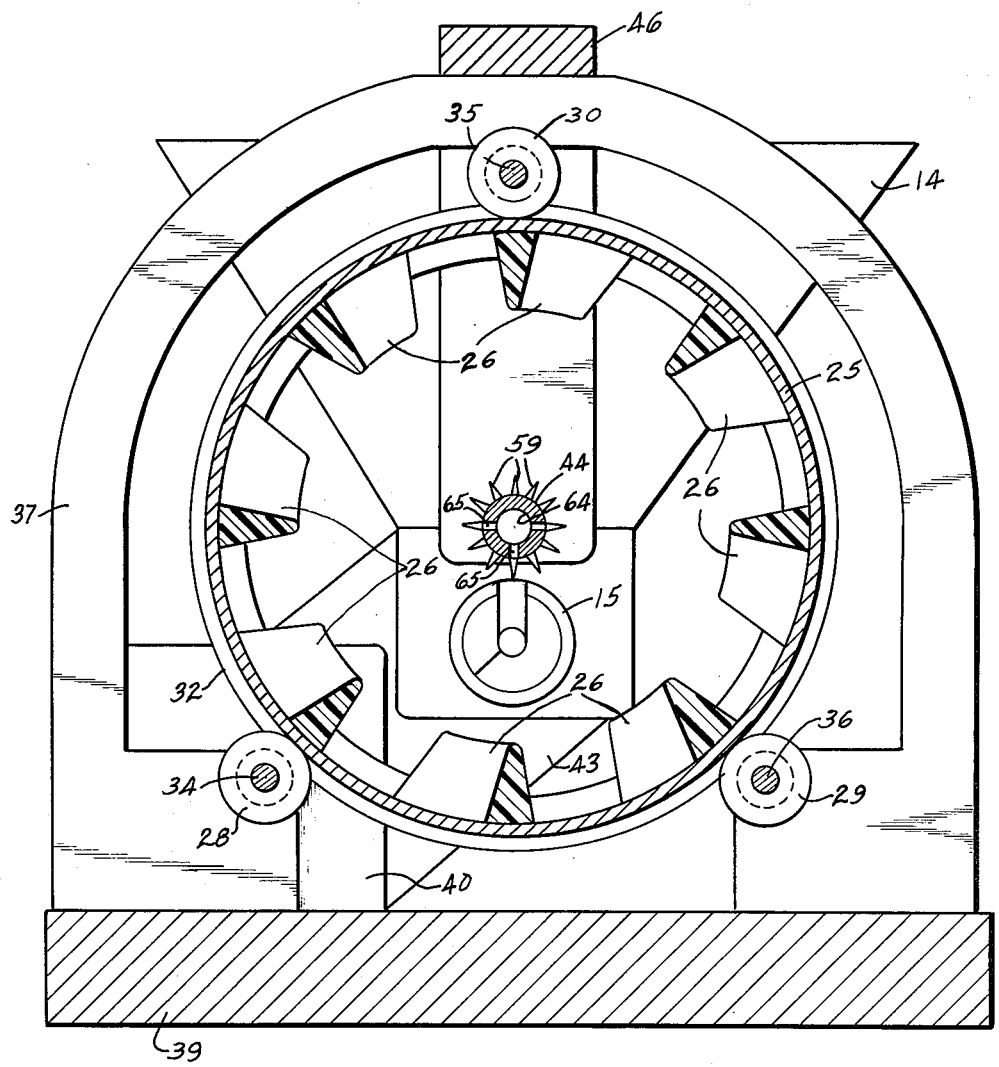

United States Patent Office 3,233,030
Patented Feb. 1, 1966

3,233,030
APPARATUS FOR HIGH FREQUENCY
TREATMENT OF ORE
Lawrence H. Connell, Indialantic, Fla., and Lowell A. Moe, Minneapolis, Minn., assignors to F. H. Peavey & Company, Minneapolis, Minn., a corporation
Filed May 12, 1960, Ser. No. 28,767
10 Claims. (Cl. 13—10)

This invention relates to a method and apparatus for treatment of ores, operating in apparent defiance of the principles and teachings followed in the prior art, but with many advantageous results of far reaching importance.

In northern Minnesota there are vast deposits of hematite iron ore having a grade or percentage iron content which is too low for economic use thereof. Various methods of treating such ores have been considered with the object of increasing the grade thereof to a value which would permit economic shipping of the ore to smelting and steel making centers. Furnaces used for smelting and steel making such as blast furnaces, induction furnaces and electric arc furnaces, are too expensive to operate in the mining regions and have features which make them unsuitable for possible upgrading of ores prior to shipping. Methods have been proposed for reducing hematite, a non-magnetic oxide ($Fe_2O_3$) to magnetite, a magnetic oxide ($Fe_3O_4$), which can be readily separated out by magnetic processes to produce a high grade product which can be economically shipped to smelting and steel making centers. In such reducing methods, the hematite ore is heated to high temperatures in the presence of a reducing agent which combines with oxygen, and it is necessary to use a closed retort or the like to exclude air so far as possible. Thus a cheap fuel and expensive equipment would be required with such proposed methods.

This invention is based upon the discovery that efficient decomposition or ore compounds into more readily usable forms can be obtained by using electrical fields of sufficient intensity. Contrary to what might be expected, it is not necessary to generate large amounts of heat. The amount of energy required is but a small fraction of the energy required to produce equivalent results with conventional reduction methods. It is also not necessary to use furnaces or closed retorts and the required apparatus is relatively simple and inexpensive.

The exact phenomena which account for such results are not known. However, it has been established that the amount of decomposition is greatly increased when the intensity of the electrical field is sufficient to produce a multiplicity of small spasmodic arcs between ore particles and between the ore and the electrodes used for developing the field. Such random arcs apparently develop instantaneous temperatures sufficient to cause decomposition of the ore compounds. Indeed, an analysis of the ore after treatment shows a marked increase in the percentage of substantially pure metal.

It has also been established that the decomposition is greatly increased by the use of a high frequency field, which increases the arcing effect. The high frequency field also produces internal heating of the ore, apparently developing sufficient temperatures to bring about chemical decomposition and at the same time sufficient pressure to drive off products of the decomposition. In the treatment of hematite ore, for example, it is found that oxygen is evolved from granules of the ore under treatment. It is believed that each ore particle or granule forms a miniature retort within which the decomposition takes place, the heat being developed internally by the action of the high frequency field. The entrance of air is prevented by developing sufficient pressure within the granules to cause outward flow of the gases evolved from the decomposition.

Certain features are necessary or desirable in increasing the efficiency of the method:
(1) The ore should be ground into small particles or granules which increases the production of random spasmodic arcs and also increases the benefits obtained by use of a high frequency field.
(2) As might be expected, water is undesirable in that it provides a cooling effect and free water inhibits arcing. However, it is found that up to a certain point, the presence of water is highly desirable. Each granule should preferably contain an amount of water approaching the maximum amount it can absorb to increase its electrical conductivity to promote arcing between granules and to increase internal heating when a high frequency field is used. With most ores, it is actually necessary to add a considerable amount of water. And, since water is vaporized by the heat generated by the treatment, it is usually desirable to add water during the treatment.
(3) It is highly desirable that the ore be agitated during the process to minimize agglomeration of the particles to increase arcing between particles and to promote release of vapors therefrom.
(4) In some circumstances, it is desirable to add fuel to the ore prior to or during treatment, to combine with oxygen evolved from decomposition of the ore compounds, to develop heat and to minimize any reverse action of the process when the treatment is ended. The desirability of this feature depends upon the type of ore, the elements and compounds naturally present therein and, of course, the cost of the fuel. In general, only a small amount of fuel is required. When a liquid or a solid fuel is used it should preferably be absorbed by or intimately admixed with the particles or granules of the ore prior to treatment. A gaseous fuel may be applied during the treatment which should then be performed in the absence of air, so far as possible.

The invention is not limited to any particular type of ore, but is particularly advantageous in the treatment of hematite ore, to cause the decomposition of hematite into magnetite and to pure iron, the magnetite and pure iron being readily separated out by magnetic processes. In some circumstances it is desirable to perform a subsequent treatment on the product obtained by magnetic separation after a first treatment.

Further features of the invention reside in the provision of apparatus for performing the process in a highly efficient and effective manner.

This invention contemplates other and more specific objects, features and advantages which will become more fully apparent from the following detailed description taken in conjunction with the accompanying drawings which illustrate preferred embodiments and in which:

FIGURE 2 is a sectional view through a rotary drum apparatus of FIGURE 1, taken substantially along line II—II.

Figures 1, 3:
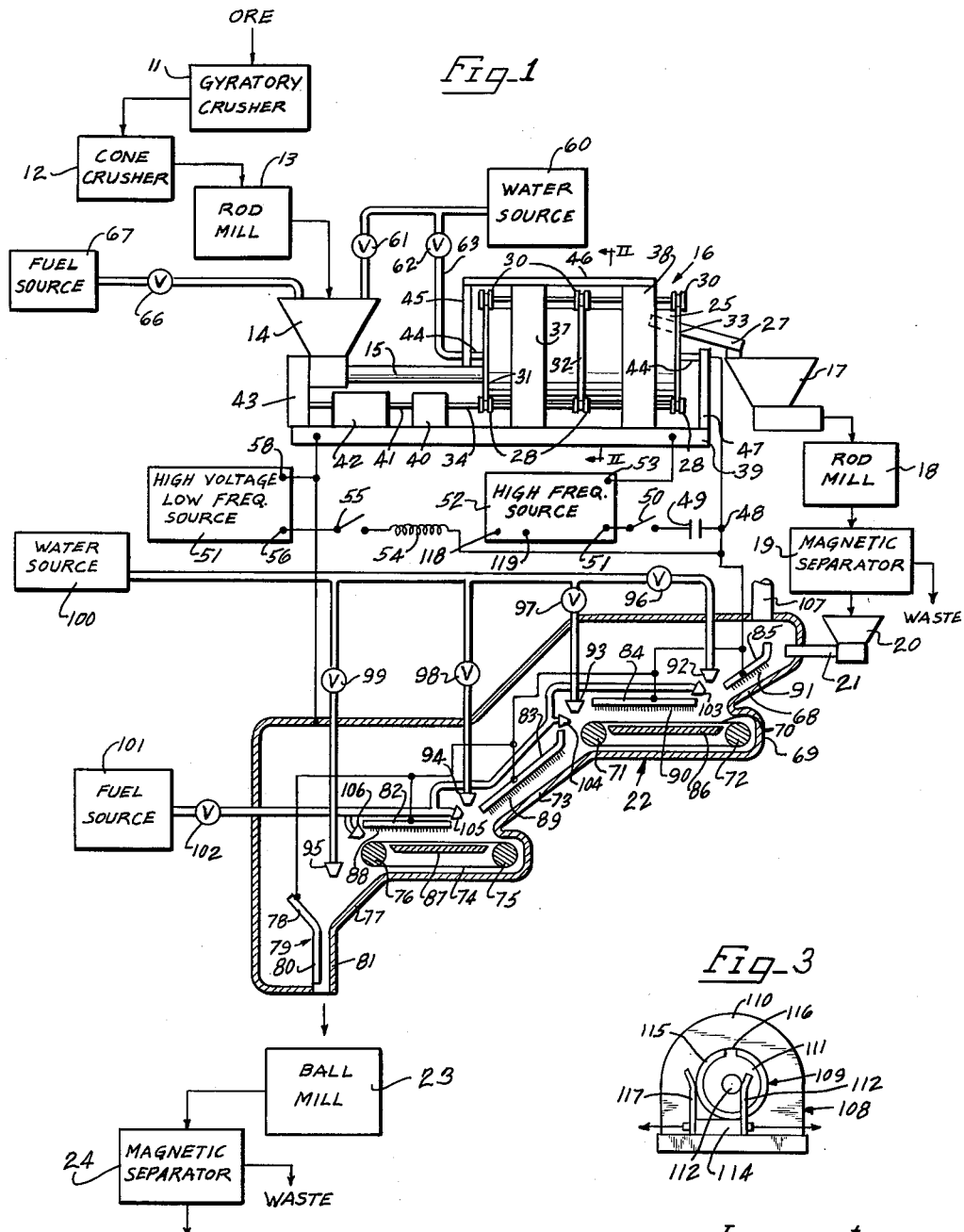
FIGURE 1 is a diagrammatic illustration of a system for treating hematite iron ore, constructed in accordance with the principles of this invention.
FIGURE 3 illustrates a switch device useable for keying the high frequency source of the system of FIGURE 1.

In the system illustrated in FIGURE 1, hematite ore is supplied in chunk form to a gyratory crusher 11 which divides the ore into smaller sized chunks which are then fed to a cone crusher 12, which reduces the size still further and feeds into a rod mill 13 used to reduce the ore into comparatively small particles or granules. The rod mill 13 feeds into a hopper 14 from which the ground ore is fed by a screw conveyor 15 into a rotary drum treatment apparatus generally designated by reference numeral 16. Apparatus 16, as will be described, treats the ore with high intensity electric fields and the treated ore is fed to a hopper 17 from which it is fed into a rod mill 18, and thence to a magnetic separator 19. The magnetic separator 19 separates out the more highly magnetic particles and supplies them to a hopper 20 from which they are fed by a screw conveyor 21 into a conveyor and electrical treating apparatus 22. After treatment by the apparatus 22, the ore is fed to a ball mill 23 and thence to another magnetic separator 24 which separates out the more highly magnetized particles. The product obtained from the magnetic separator 24 may, of course, be subjected to further separation and treatment processes prior to shipment to a smelting center.

The treatment apparatus 16 comprises a horizontal drum 25 which receives ore from the screw conveyor 15. The drum 25 has a plurality of blades projecting radially inwardly from the inside surface thereof and arranged to elevate and drop the ore as the drum 25 is rotated about a horizontal axis. The blades are also inclined or spiraled to a certain degree to cause progressive movement of the ore from the end of the drum adjacent the conveyor 15 to the opposite end thereof adjacent the hopper 17. A trough 27 receives the ore and feeds it to the hopper 17.

To support the drum 25 for rotation, a first set of three rollers 28 and a second set of three rollers 29 are engaged with the underside thereof on opposite sides of a vertical plane through the drum axis. A third set of three rollers 30 engages the upper side of the drum. To prevent axial movement of the drum, the rollers 28, 29 and 30 are grooved to receive rims 31, 32 and 33 provided on the outside of the drum.

The rollers 28, 29 and 30 are affixed to shafts 34, 35 and 36 which are supported in a frame which comprises a pair of inverted U-shaped members 37 and 38 supported on a base 39. To rotate the drum, the shaft 34 is coupled to a gear reduction unit 40 which is coupled through a shaft 41 to a drive motor 42, the unit 40 and the motor 42 being supported on the base 39. The motor 42 may also drive the conveyor 15 through a coupling unit 43.

To develop an electrical field within the drum 25, a conductor 44 is disposed coaxially therewithin. At one end, the conductor 44 is affixed to the lower end of a hanger member 45 which is secured to a frame member 46 affixed to the upper ends of the frame members 37 and 38. At the other end, the conductor 44 is secured to the upper end of an upright member 47 secured to the base 39. The conductor 44 is, of course, insulated from the drum 25. Preferably, the supports 45 and 47 are of insulating material.

The conductor 44 is connected to a circuit point 48 which is connected through a capacitor 49 and a switch 50 to one terminal 51 of a high frequency source 52 having a second terminal 53 connected to the base 39. The frequency of source 52 should be high enough to induce internal heating of the ore granules. A frequency of about 27 megacycles has been found to be satisfactory but frequencies up to 1000 megacycles or even higher may be used. Circuit point 48 is also connected through a choke coil 54 and a switch 55 to one terminal 56 of a high voltage, low frequency source 57 having a second terminal 58 connected to the base 39. Source 57 may supply either direct current or a low frequency alternating current, such as 60 cycle current, it being understood that "low frequency" as used herein, includes direct current. It will be appreciated that when the switch 50 is closed, a high frequency field is developed between the drum 25 and the conductor 44 supported coaxially therewithin. When the switch 55 is closed, a high voltage low frequency field is superposed on the high frequency field. The capacitor 49 and the choke coil 54 serve to isolate the two sources. The capacitor 49 has a high impedance at low frequencies and a low impedance at high frequencies. The choke coil 54 has a low impedance at low frequencies and a high impedance at high frequencies.

To stimulate the production of arcs between the conductor 44 and the material, the conductor 44 is provided with a series of pointed projections 59 projecting radially outwardly therefrom, spaced along the axis of the conductor and also spaced angularly to project in all principal directions therefrom. The points 59 may, for example, be arranged in a spiral formation on the conductor 44. These points serve to intensify the high potential field and greatly increase the production of arcs.

The high frequency field increases the production of arcs and in some circumstances may be used alone to produce the arcing effect, without the low frequency field. The high frequency field also acts to produce internal heating of the ore granules, as explained above. In normal operation most of the ore lies at the bottom of the drum, between the blades 26 and to increase the effectiveness of the high frequency field, the blades 26 are preferably of an insulating material, most preferably a plastic material which will not absorb moisture.

With most ores, it is desirable to greatly increase the moisture content of the ore granules before treatment. For this purpose, water is supplied from a source 60 through a control valve 61 to the hopper 14, for absorption into the granules within the hopper 14 and as they are moved through the screw conveyor 15. It is also desirable in most circumstances to add water during the treatment and the water source 60 is also connected through a valve 62 and a conduit 63 of insulating material to one end of the conductor 44 which has a passage 64 therethrough and a plurality of openings 65 spaced axially along the conductor and also angularly to spray the water on the ore being treated. It will be appreciated, of course, that other means may be employed to introduce the water such as a separate pipe, for example.

It is also desirable with many ores to add fuel thereto as explained above. For this purpose fuel may be supplied to the hopper 14 through a valve 66 connected to a fuel source 67. Excellent results have been obtained using kerosene as the fuel. It is also possible to use solid fuels, and also gaseous fuels. In the latter case, it is desirable to perform the treatment in the absence of air, so far as possible, and to make provisions for carrying away the products of the decomposition.

Referring now to the lower portion of FIGURE 1, ore from the screw conveyor 21 slides down an inclined portion 68 of a metallic housing 69 onto a conveyor belt 70 supported within the housing 69 by rollers 71 and 72. The conveyor belt 70 is driven by suitable means, not shown, and drops the ore onto another inclined portion 73 of the housing, on which the ore flows down to a second conveyor belt 74 also supported within the housing by rollers 75 and 76. Conveyor belt 74 drops the ore into a trough formed by another inclined portion 77 of the housing and an inclined portion 78 of an electrode 79 which has a lower vertical portion 80 in spaced relation to a vertical portion 81 of the housing. The ore passing between portions 80 and 81 is fed directly or indirectly to the ball mill 23.

Additional electrodes 82, 83, 84 and 85 are supported in spaced relation over the conveyor belt 74, the inclined housing portion 73, the conveyor 70 and the inclined housing portion 68, respectively. All electrodes are insulated from the housing and are connected to the circuit point 48, the housing being connected to terminals 53 and 58 of the sources 52 and 57. The conveyor belts 70 and 74 may be of conductive material electrically connected to the housing or, as shown, plates 86 and 87 of conductive material are supported therebelow. The electrodes 82, 83, 84 and 85 are preferably provided with a plurality of downwardly projecting points 88, 89, 90 and 91 to provide a brush-like configuration. The points 88–91 have the same function as the points 59 in the apparatus 16 described above.

Water is supplied to the ore being treated by means of a spray nozzle 92 between electrodes 84 and 85, a spray nozzle 93 between the electrodes 83 and 84, a spray nozzle 94 between electrodes 82 and 83, and a spray nozzle 95 over the trough formed by portions 77 and 78. Nozzles 92, 93, 94 and 95 are respectively connected through valves 96, 97, 98 and 99 to a water source 100.

The apparatus 22 also incorporates means for applying gaseous fuel to the ore being treated. In particular, a fuel source 101 is connected through a valve 102 to a nozzle 103 located between electrodes 84 and 85, a nozzle 104 located between electrodes 83 and 84, a nozzle 105 located between electrodes 82 and 83, and a nozzle 106 adjacent the end of electrode 82. The fuel combines with oxygen emanated from the ore being treated and produces additional heat which promotes the reduction process. The combustion products may be carried away through a vent 107 at the upper end of the housing 69.

Referring to FIGURE 3, reference numeral 108 illustrates a switch device which may be used to key the high frequency source 52. Device 108 comprises a rotating commutator 109 driven by a small electric motor 110. The commutator 109 includes a conductive member 111 having a hub 112 engaged by a contact 113 supported by an insulating block 114. Member 111 is surrounded by an insulator 115, except for a small segment 116 which engages a contact 117 during a small portion of each revolution, contact 117 being supported on the block 114. Contacts 112 and 117 may be connected to terminals 118 and 119 of the high frequency source 52, to cause operation of the source only during the interval when contact 117 engages segment 116. Thus a pulsed high frequency signal is applied. This is found to be more efficient in many circumstances, the degree of chemical decomposition being apparently a function of the peak high frequency power applied.

It will be appreciated that a liquid or solid fuel may be used in place of or in addition to gaseous fuel in the apparatus 22. For example, a liquid or solid fuel may be added at the hopper 20. It will likewise be appreciated that either the apparatus 16 or the apparatus 22 may be used alone for the treatment of ore, or either type of apparatus may be substituted for the other in a sequential treatment system, such as illustrated. It is also possible to eliminate the magnetic processing step between the electrical field processing steps, by eliminating the magnetic separator 19. It is desirable in any case, however, to grind the ore after the electrical treatment which produces a sintering effect and agglomeration of the granules. The desirability of any such modifications depends upon the type of ore being treated and the relative economies involved.

It will be understood that other modifications and variations may be effected without departing from the spirit and scope of the novel concepts of this invention.

We claim as our invention:

1. In ore treating apparatus, a pair of spaced electrodes adapted to receive the ore therebetween, means for conveying solid ore along a path between said electrodes, means for applying a high voltage to said electrodes, and a plurality of points of conductive material extending from at least one of said electrodes toward the other to promote arcing within the ore and at least partial chemical decomposition of a compound therewithin.

2. In ore treating apparatus, means for subjecting ore to an electrical field of an intensity and frequency sufficient to heat the ore comprising a horizontal metal drum, a conductor therewithin, means applying a voltage between said drum and said conductor, and means for agitating the ore comprising means for rotating said drum and blades on the inside of said drum for elevating and dropping the ore as the drum is rotated.

3. In ore treating apparatus, means for subjecting ore to an electrical field of an intensity and frequency sufficient to heat the ore comprising a horizontal metal drum, a conductor therewithin, means for applying a high frequency voltage between said drum and said conductor, and means for agitating the ore comprising means for rotating said drum and blades of insulating material on the inside of said drum for elevating and dropping the ore as the drum is rotated.

4. In ore treating apparatus, means for subjecting ore to an electrical field comprising a horizontal metal drum, a conductor therewithin, means applying a voltage between said drum and said conductor, and means for agitating the ore comprising means for rotating said drum and blades on the inside of said drum for elevating and dropping the ore as the drum is rotated, said conductor having a plurality of radially outwardly projecting points spaced axially therealong.

5. In ore treating apparatus, electrode means for receiving the ore, means for conveying solid ore along a path between said electrodes, a high frequency source of an intensity and frequency sufficient to heat the ore, a low frequency high voltage source, and means simultaneously connecting said sources to said electrode means including means for isolating said sources.

6. In ore treating apparatus, electrode means for receiving the ore, means for conveying ore along a path between said electrodes, a high frequency source of an intensity and frequency sufficient to heat the ore, and means for simultaneously connecting said high frequency source to said electrode means to apply pulsed high frequency power to said electrode means.

7. In ore treating apparatus, a pair of spaced electrodes disposed in generally parallel confronting relation over a substantial length thereof in comparison to the spacing therebetween, means for conveying ore along a path between said electrodes and along the length of said electrodes, electric field means for establishing a high frequency electric field simultaneously over substantially the entire length of said electrodes for subjecting the material along said path to said electric field over substantially the entire length of the electrodes, and means including a low frequency source connected to said electrodes, said electric field means providing an electric field at said path of frequency and intensity to produce at least partial chemical decomposition of a compound in said ore.

8. In ore treating apparatus, a pair of spaced electrodes disposed in generally parallel confronting relation over a substantial length thereof in comparison to the spacing therebetween, means for conveying ore along a path between said electrodes and along the length of said electrodes, electric field means for establishing a high frequency electric field simultaneously over substantially the entire length of said electrodes for subjecting the material along said path to said electric field over substantially the entire length of the electrodes, and means including a low frequency source connected to said electrodes, said electric field means providing an electric field at said path of frequency and intensity to produce at least partial chemical decomposition of a compound in said ore, said electric field means producing an electric field comprising an electric field component having a frequency of at least about 1000 megacycles per second.

9. In ore treating apparatus, a pair of spaced electrodes disposed in confronting relation over a substantial length thereof, means providing an intimate mixture of fuel and ore along the length of the space between said electrodes, electric field means for establishing a high frequency electric field simultaneously over substantially the entire space between said electrodes occupied by said mixture, and means including a low frequency source connected to said electrodes, said electric field means producing an electric field having a frequency and intensity to produce at least partial chemical decomposition of a compound in said ore.

10. In ore treating apparatus, a pair of elongated electrodes disposed in generally parallel confronting relation over a substantial length thereof in comparison to the spacing between said electrodes, means for producing an intimate mixture of hematite ore and a fuel to combine with oxygen evolved from decomposition of the hematite ore and for conveying the hematite ore along a path between and generally parallel to said electrodes over the length of said electrodes, electric field means for establishing an electric field comprising an electric field component having a frequency of at least about 1000 megacycles per second over substantially the entire length of said path of said hematite ore between said electrodes, and means including a low frequency source connected to said electrodes, said electric field means providing an electric field of frequency and intensity in the region of said path to convert at least a portion of said hematite ore to magnetically responsive material.

References Cited by the Examiner

UNITED STATES PATENTS

| | | | |
|---|---|---|---|
| 484,466 | 10/1892 | Searing | 313—309 |
| 488,002 | 12/1892 | Garton | 313—309 |
| 556,626 | 3/1896 | Gerard et al. | 219—121 |
| 896,245 | 8/1908 | Reid | 75—10 |
| 1,094,354 | 4/1914 | Van Wilmowsky | 13—10 |
| 1,316,445 | 9/1919 | Island | 204—325 |
| 2,191,377 | 2/1940 | Gallusser | 75—10 |
| 2,217,448 | 10/1940 | Muller | 219—121 |
| 2,277,067 | 3/1942 | Brassert | 75—10 |
| 2,542,028 | 2/1951 | Hodge | 219—10.65 X |
| 2,784,349 | 3/1957 | Anderson | 219—135 X |
| 2,860,276 | 11/1958 | Grogg et al. | 313—351 |
| 2,864,877 | 12/1958 | Harders et al. | 13—10 X |

FOREIGN PATENTS 3,910    1900   Great Britain.

OTHER REFERENCES

German printed application, Hagen, S 31,473, June 14, 1956, 204–155.

ANTHONY BARTIS, *Primary Examiner.*

RICHARD M. WOOD, NATHAN MARMELSTEIN, WINSTON A. DOUGLAS, JOSEPH V. TRUHE, *Examiners.*